(12) United States Patent
Mediratta

(10) Patent No.: US 8,255,623 B2
(45) Date of Patent: Aug. 28, 2012

(54) ORDERED STORAGE STRUCTURE PROVIDING ENHANCED ACCESS TO STORED ITEMS

(75) Inventor: Sumit Dharampal Mediratta, Shivpuri (IN)

(73) Assignee: Nvidia Corporation, Santa Clara, CA (US)

(*) Notice: Subject to any disclaimer, the term of this patent is extended or adjusted under 35 U.S.C. 154(b) by 506 days.

(21) Appl. No.: 11/860,536

(22) Filed: Sep. 24, 2007

(65) Prior Publication Data
US 2009/0083499 A1   Mar. 26, 2009

(51) Int. Cl.
*G06F 13/14* (2006.01)
(52) U.S. Cl. ......... 711/108; 707/758; 710/54; 711/154
(58) Field of Classification Search .......... 711/108, 711/154; 710/54; 707/758
See application file for complete search history.

(56) References Cited

U.S. PATENT DOCUMENTS

| | | |
|---|---|---|
| 4,061,999 A | 12/1977 | Proebsting et al. |
| 5,012,448 A | 4/1991 | Matsuoka et al. |
| 5,258,669 A | 11/1993 | Nakashima |
| 5,428,565 A | 6/1995 | Shaw |
| 5,446,686 A | 8/1995 | Bosnyak et al. |
| 5,471,189 A | 11/1995 | Dietz et al. |
| 5,517,441 A | 5/1996 | Dietz et al. |
| 5,543,738 A | 8/1996 | Lee et al. |
| 5,610,573 A | 3/1997 | Priebe |
| 5,659,687 A | 8/1997 | Kim et al. |
| 5,673,221 A | 9/1997 | Calligaro et al. |
| 5,726,935 A | 3/1998 | Kim |
| 5,726,942 A | 3/1998 | Yoneda et al. |
| 5,740,108 A | 4/1998 | Okubo |
| 5,748,546 A | 5/1998 | Bauer et al. |
| 5,751,632 A | 5/1998 | Choi et al. |
| 5,818,786 A | 10/1998 | Yoneda |
| 5,828,616 A | 10/1998 | Bauer et al. |
| 5,838,612 A | 11/1998 | Calligaro et al. |
| 5,999,435 A | 12/1999 | Henderson et al. |
| 6,012,131 A | 1/2000 | Kang |
| 6,058,038 A | 5/2000 | Osada et al. |
| 6,157,991 A * | 12/2000 | Arnon .......................... 711/161 |
| 6,181,591 B1 | 1/2001 | Miyatake et al. |
| 6,191,969 B1 | 2/2001 | Pereira |
| 6,191,970 B1 | 2/2001 | Pereira |
| 6,243,280 B1 | 6/2001 | Wong et al. |

(Continued)

FOREIGN PATENT DOCUMENTS
EP   0363332   9/1989

OTHER PUBLICATIONS

Zukowski, Charles A. and Shao-Yi Wang, "Use of Selective Precharge for Low Power on the Match Lines of Content-Addressable Memories", 0/8186-8099-7/97, 1997 IEEE.

*Primary Examiner* — Jae Yu

(57) ABSTRACT

An ordered storage structure implemented based on a content addressable memory (CAM). In an embodiment, a set of identifiers are formed with an order matching a desired access order for items. Each item is stored with a corresponding identifier in an entry of the CAM, with the identifiers being stored in the searchable fields/columns of the CAM. Thus, the items can be retrieved in the desired access order by providing the identifiers as search key inputs to the CAM in the desired access order.

19 Claims, 8 Drawing Sheets

U.S. PATENT DOCUMENTS

| | | |
|---|---|---|
| 6,307,718 B1 | 10/2001 | Kasetty |
| 6,307,798 B1 | 10/2001 | Ahmed et al. |
| 6,442,090 B1 | 8/2002 | Ahmed et al. |
| 6,538,947 B2 | 3/2003 | Ahmed et al. |
| 6,584,003 B1 | 6/2003 | Kim et al. |
| 6,667,924 B2 | 12/2003 | Ahmed et al. |
| 6,708,250 B2 | 3/2004 | Gillingham |
| 6,768,659 B2 | 7/2004 | Gillingham et al. |
| 6,771,525 B2 | 8/2004 | Roth |
| 6,873,531 B2 | 3/2005 | Ahmed et al. |
| 7,042,746 B2 | 5/2006 | Roth |
| 2003/0191916 A1* | 10/2003 | McBrearty et al. ........... 711/162 |
| 2004/0049630 A1* | 3/2004 | Stark ............................. 711/108 |
| 2005/0081006 A1* | 4/2005 | Shackelford et al. ......... 711/162 |

* cited by examiner

| Queue Identifier 521 | Write Counter 522 | Read Counter 523 | Write Identifier 524 | Read Identifier 525 |
|---|---|---|---|---|
| SRA | 4 | 1 | SRA4 | SRA1 |
| SRB | 2 | 0 | SRB 2 | SRB0 |
| | | | | |
| SRZ | 7 | 7 | SRZ7 | SRZ7 |

| SR 521 | Write Counter 522 | Read Counter 523 | Write Identifier 524 | Read Identifier 525 |
|---|---|---|---|---|
| SRA | 5 | 2 | SRA5 | SRA2 |
| SRB | 2 | 0 | SRB2 | SRB0 |
| | | | | |
| SRZ | 7 | 7 | SRZ7 | SRZ7 |

FIG. 5D

| CAM Physical Address 511 | Item 512 | Search Field 513 |
|---|---|---|
| Address N - 1 | SR A Item 1 | SRA1 |
| | | |
| Address i + 1 | SR A Item3 | SRA3 |
| Address i | SR B Item 0 | SRB0 |
| Address i - 1 | SR B Item 1 | SRB1 |
| | | |
| Address j - 1 | SR A Item4 | SRA4 |
| | | |
| Address 1 | SR A Item 2 | SRA2 |
| Address 0 | SR A Item 0 | SRA0 |

ORDERED STORAGE STRUCTURE PROVIDING ENHANCED ACCESS TO STORED ITEMS

FIELD OF DISCLOSURE

The present disclosure relates generally to buffers and more specifically to ordered storage structure providing enhanced access to stored items.

RELATED ART

Ordered storage structures generally refer to structures storing successive items such that the order in which the items arrived is preserved and the knowledge of the arrival order is used in accessing (reading/over-writing) the stored items. The read access to the items may be in the order in which the items were stored, in which case the storage structure is referred to as a first-in-first-out (FIFO). As another example, the read access may be in the reverse order of the stored order, in which case the storage structure is referred to as a last-in-first-out (LIFO).

Ordered storage structures are often implemented using linked lists, with the linking information identifying the desired access order and/or stored order (in the stored items). The linking information may be implemented as links, with each link pointing to the next item (or location storing the next item) in the desired order. Thus, accessing the internal items (not head or tail) of linked list may entail traversing the links sequentially, which may entail delays due to the sequential nature of traversing.

It is desirable at least in some special circumstances that user have enhanced access to the items stored in ordered storage structures.

BRIEF DESCRIPTION OF THE DRAWINGS

Example embodiments will be described with reference to the following accompanying drawings, which are described briefly below.

FIGS. 5A and 5D are tables depicting the logical manner in which items and their corresponding identifiers are stored in a CAM in corresponding states, in one embodiment of the present invention.

FIGS. 5B and 5C are tables depicting logically example identifiers and their generation, in an embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present invention, an ordered storage structure is provided based on a Content Addressable Memory (CAM). A controller in the ordered storage structure may receive multiple items which are to be accessed according to an access order (e.g., FIFO), and the controller stores each item associated with a corresponding one of a set of identifiers in the corresponding entry of the CAM. The identifiers are designed to be in an order matching the access order and are stored in a searchable field of the CAM.

To retrieve the items in the access order, the controller provides the identifiers as the search key input in the above noted access order to the CAM.

By storing the items in the CAM, enhanced search capabilities may be provided, in addition to providing the desired access order.

According to another aspect of the present invention, a CAM based ordered storage structure is provided within a storage controller, which processes read/write requests to data storage. The ordered storage structure is used to provide FIFO access of the read and write requests directed to each port connecting to corresponding data storage.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
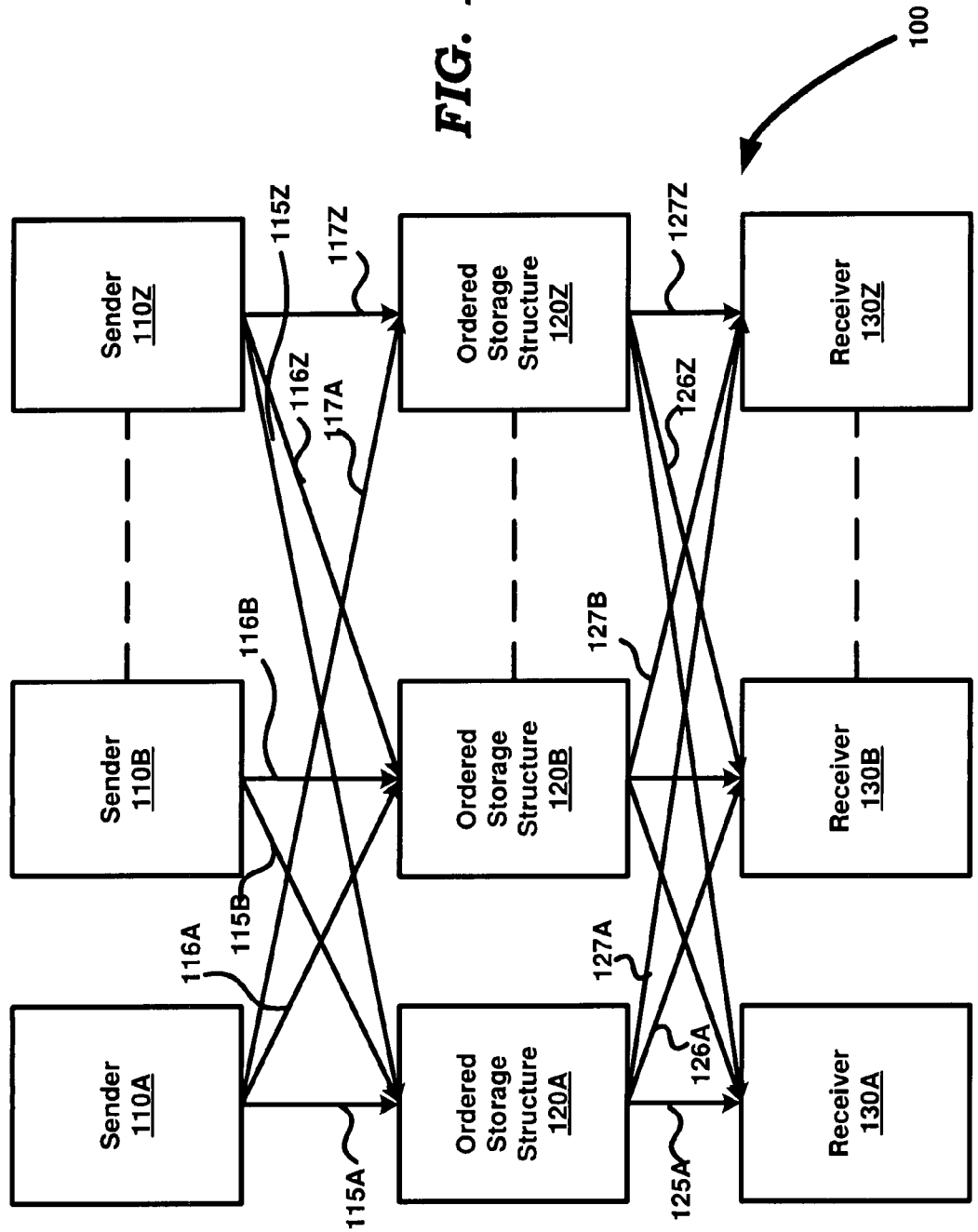
FIG. 1 is a block diagram illustrating an example environment in which several aspects of the present invention may be implemented.

FIG. 1 is a block diagram of an example environment in which several aspects of the present invention may be implemented. The environment is shown containing senders 110A-110Z, ordered storage structures 120A-120Z and receivers 130A-130Z. Each block of FIG. 1 is described below in further detail.

The block diagram is shown containing only representative systems for illustration. However, real-world environments may contain more/fewer/different systems/components as will be apparent to one skilled in the relevant arts. For example, only a single sender or a single receiver may be present, though multiple senders/receivers are shown.

Similarly, each storage structure may be dedicated to a particular sender or receiver. As another example, multiple storage structures may be integrated into a single unit, though logically operating as different ordered storage structures between a sender and receiver pair. Implementations in such environments are also contemplated to be within the scope and spirit of various aspects of the present invention.

Each sender 110A-110Z sends items to one or more of receivers 130A-130Z using storage structures 120A-120Z. Generally each item represents a digital value. It may be appreciated that all paths originating at senders 110A, 110B and 110Z are suffixed with A, B and Z respectively. Similarly, all paths terminating at ordered storage structures 120A, 120B and 120Z are respectively prefixed with 115, 116 and 117. Thus, a path from sender 110B to ordered storage structure 120B is shown with a path referred to as 116B.

Ordered storage structures 120A-120Z receive the items from senders 110A-110Z and store (queue) the items and retain information representing the various orders of interest. The order may include one or more of the stored order (the order in which the items are received by the ordered storage structure), the retrieve order (the order in which the items are to be retrieved), etc. In general, the term access order is used to refer to one or both of the stored and retrieve orders.

Each receiver 130A-130Z may receive items from one or more ordered storage structures 120A-120Z over paths 125A-125Z, 126A-126Z and 127A-127Z. Each receiver 130A-130Z may receive the items in a desired access order consistent with the implementation of ordered storage structure. It may be appreciated that all paths originating at ordered storage structures 120A, 120B and 120Z are respectively suffixed by A, B and Z. Paths terminating at receivers 130A, 130B and 130Z are shown prefixed with 125, 126 and 127 respectively.

Thus, ordered storage structures 120A-120Z provide for buffering of the items before providing them to receivers. The items may be buffered, for example, due to speed mismatch between senders 110A-110Z and the corresponding receiver/s to which the items are sent. The speed mismatch refers to the inability of the receiver/s to receive items at the same rate at which the items are sent by the sender.

Ordered storage structures implemented according to an aspect of the present invention provide for enhanced access to data items while facilitating ordered accesses, as described below with examples.

3. Ordered Storage Structure

Figure 2:
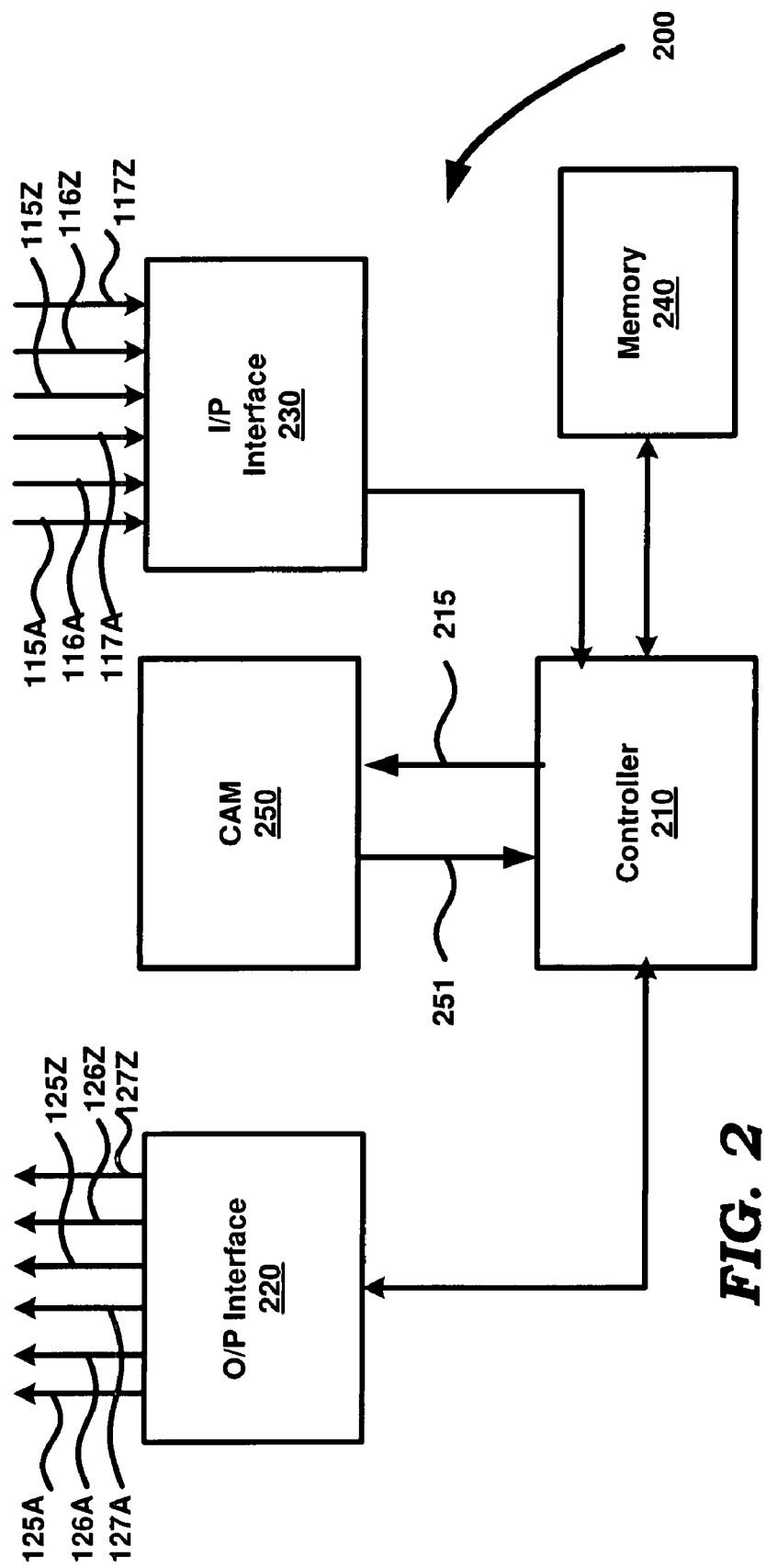
FIG. 2 is a block diagram illustrating the details of storage structures, providing enhanced access to stored items in one embodiment of the present invention

FIG. 2 is a block diagram illustrating the details of storage structures, providing enhanced access to stored items in one embodiment of the present invention. Ordered storage structure 200 is shown containing controller 210, O/P (Output) interface 220, I/P (input) Interface 230, memory 240 and CAM (Content Addressable Memory) 250. Each block is described in further detail below.

Again, merely for illustration, only representative number/type of blocks are shown in FIG. 2. Many environments often contain many more/fewer/different blocks, both in number and type, depending on the purpose for which the environment is designed, as will be apparent to one skilled in the relevant arts. As will be clear from the description below, ordered storage structure 200 may support one or more of the ordered storage structures (120A-120Z) of FIG. 1.

Input Interface 230 provides the physical, electrical and protocol interfaces necessary for senders 110A-110Z to send items to be stored in CAM 250. Similarly, output interface 220 provides the physical, electrical and protocol interfaces necessary for receivers 130A-130Z to receive items from CAM 250. These interfaces may be implemented using well-known interfaces.

Memory 240 contains locations to store program (instructions) and/or data, which are used by controller 210 during operation of ordered storage structure 200. The instructions, when executed by the controller 210 perform actions necessary to implement the features of the present invention, in one embodiment. Alternatively, state machines may be used with appropriate hardware and micro-instruction support to implement the same functionality.

The data may correspond to identifiers, read pointers, write pointers, etc. (described in sections below). Memory 240 may contain structures such as random access memory (RAM), registers, etc., well known in the relevant arts, to store the data/instructions.

Content Addressable Memory (CAM) 250 contains locations searchable by content and is used to store digital values. In general, when a search key (a value which is to be searched for) is received on path 215, CAM 250 provides the content of matching (in the search fields) location(s) on path 251. Various mechanisms may be provided to search only part (e.g., only first 10 bits of the 128 bits of each location) of the content of each location for retrieving remaining contents of that location. CAM 250 can be implemented using various types of CAMs such as binary CAMs, ternary CAMs, etc., well known in the relevant arts. CAM 250 may be generally designed to complete the search and provide the result/s within a single access cycle.

Controller 210 stores items (received from input interface 230) in CAM 250 (along with identifiers representing desired access order(s)) and retrieves the stored items (sent via output interface 220) according to several aspects of the present invention to implement retrieval of items in a desired order as described with examples below.

4. Writing to an Ordered Storage Structure

Figure 3:
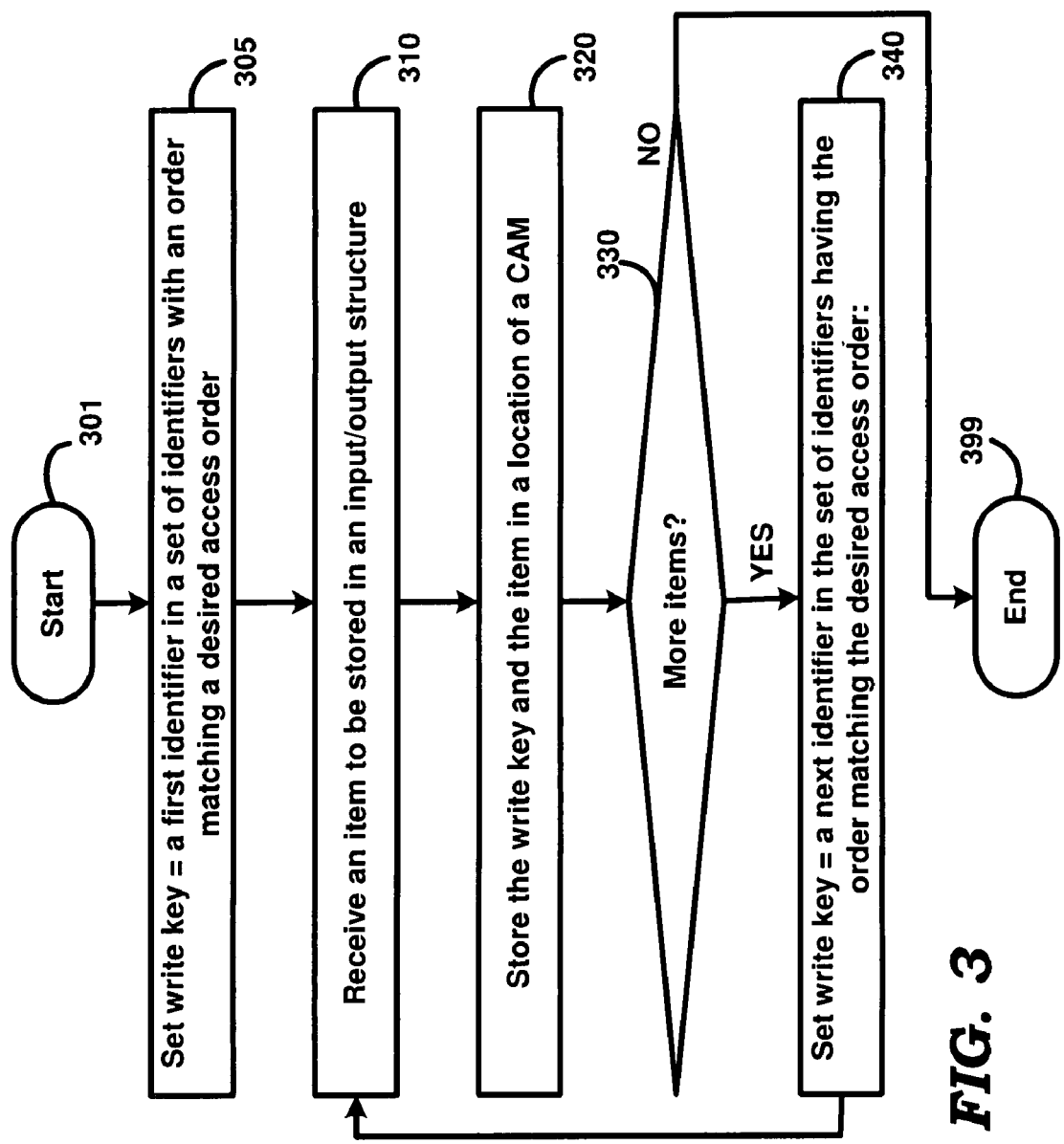
FIG. 3 is a flowchart illustrating the manner in which items can be written into an ordered storage structure implemented using a CAM, in an embodiment of the present invention.

FIG. 3 is a flowchart illustrating the manner in which items can be written into an ordered storage structure implemented using a CAM, in an embodiment of the present invention. The flowchart is described with respect to FIGS. 1 and 2 merely for illustration. However, various features can be implemented in other environments and with other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 301, in which control passes immediately to step 305.

In step 305, controller 210 sets a write key to a first identifier in a set of identifiers with an order matching a desired access order. As described below, write key holds a (write) unique (no two identifiers have the same value, at least for a given queue) identifier, which is stored along with an item received from a sender (110A-110Z). Each unique identifier may either be generated when a corresponding item is being processed or the set of unique identifiers may be generated a priori (e.g., before receiving the first item) and stored in memory 240 (such that each identifier is retrieved when needed).

The set of unique identifiers need to reflect the retrieval order. For example, in a case of a FIFO implemented for each sender-receiver pair, assuming a sender-receiver pair identification "SRA" and the first item to be stored with a count "01", an identifier "SRA01" may be generated as the identifier for the first item. The next item with an item count of "02" may have the identifier "SRA02" and so on. In general, the unique identifiers may be formed with any convention, but need to represent an order matching (consistent with) the desired retrieval order for the items.

The unique identifiers are described as being in increasing order (with an increment of 1) merely for illustration. However, the identifiers can take on any values as long as the identifiers are unique and can be identified with an order that matches the desired access order. As an extreme example, the set of identifiers can be unique random numbers, but associated in a particular (e.g., descending or arbitrary) order. These random numbers can be stored in a sequence representing the order, and each number is selected in strict sequence when using as an identifier (both during the writing of FIG. 3 and reading of FIG. 4).

In step 310, controller 210 receives an item to be stored in a storage structure. The item may be received from one of senders 110A-110Z on respective paths 115A-115Z, 116A-116Z, 117A-117Z, etc.

In step 320, controller 210 stores the write key and the item in a location of a CAM. The write key holds a unique identifier for the item to be stored and needs to be stored in the searchable field portion of each location of CAM 250. The combination of the write key and the item can be stored in any free (i.e., not already storing a write key and item combination) location of the CAM. The free locations can be indicated by any convention (e.g., using a valid bit in each entry of the CAM or a bit-vector of free locations maintained in separate registers, along with an encoder for converting the vector information into an unique CAM entry physical address).

In step 330, controller 210 checks whether there are more items to be received and stored in the CAM. Controller 210 may query the respective senders or obtain the information in other ways well known in the relevant arts. If there are more items to be received and stored, control passes to step 340. If not, control passes to step 399, where the flowchart ends. Alternatively, controller 210 may keep on querying the respective senders.

In step 340, controller 210 sets the write key to a next identifier in the set of unique identifiers having the order matching the desired retrieve order. In the FIFO example of step 305, the next unique identifier may be generated by concatenating the sender-receiver pair identification with the item count incremented by one (to reflect the updated item count), as noted above.

It may be appreciated that the items from a sender and a unique identifier for each item, are stored in a CAM so that the item may be accessed in a desired access order. The manner in which an item, stored as described above, may be accessed in one embodiment of the present invention, is described below with examples.

5. Retrieving an Item from an Ordered Storage Structure

Figure 4:
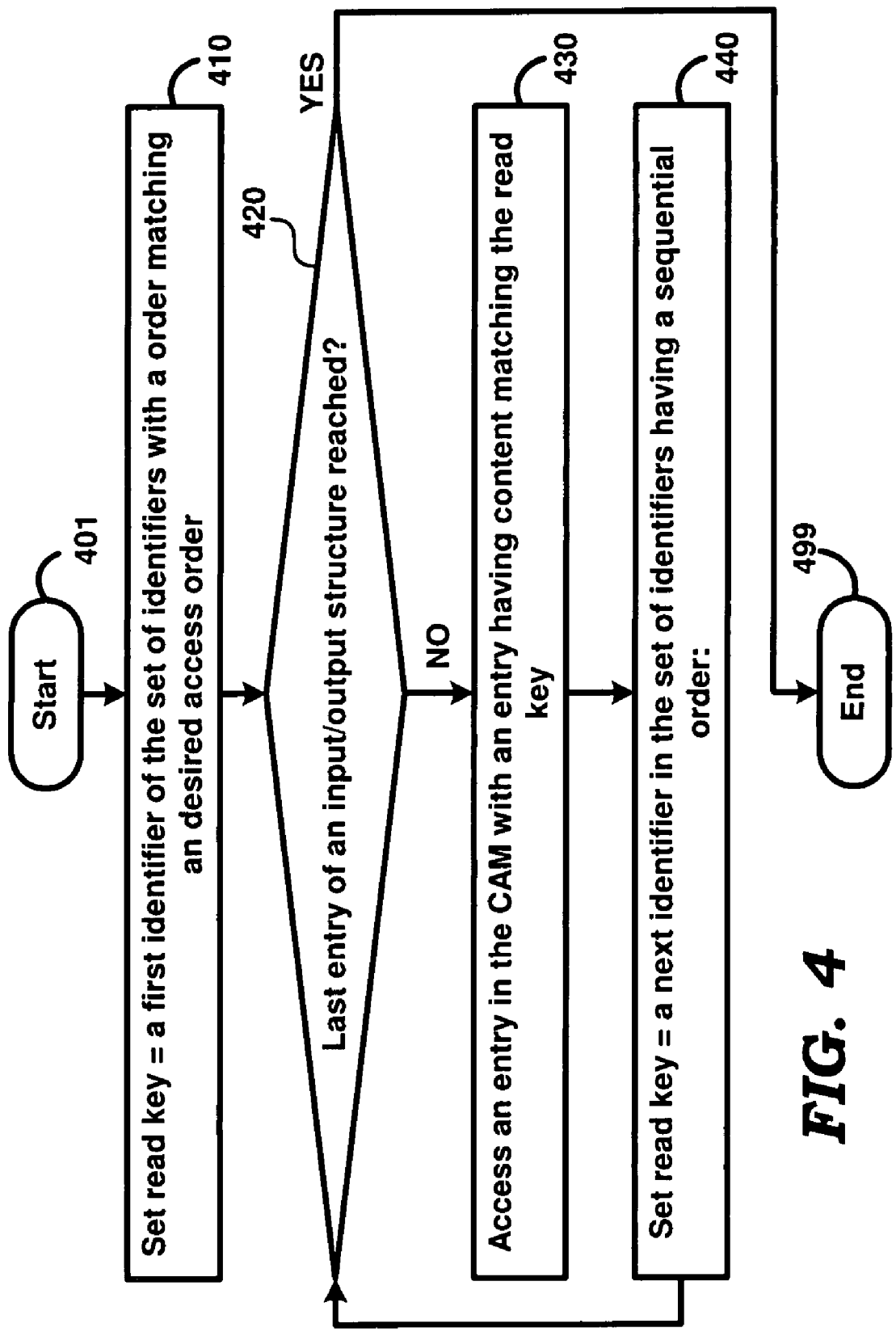
FIG. 4 is a flowchart illustrating the manner in which items, stored in an ordered storage structure implemented in a CAM, may be retrieved, in an embodiment of the present invention.

FIG. 4 is a flowchart illustrating the manner in which items, stored in an ordered storage structure implemented in a CAM may be retrieved, in an embodiment of the present invention. The flowchart is described with respect to FIGS. 1, 2 and 3 merely for illustration. However, various features can be implemented in other environments and with other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 401, in which control passes immediately to step 410.

In step 410, controller 210 sets a read key to a first identifier of the set of unique identifiers with an order matching a desired retrieve/access order. Assuming the items are stored as described above with respect to FIG. 3 and a desired FIFO retrieve order, the read key is set to the first identifier (of step 305). For example, in the example described in step 305 above, if the desired access order is FIFO, by concatenating the sender-receiver pair identification ("SRA") with the item count of the first item according to the desired access order ("01" in the example since the desired access order is FIFO), the first identifier "SRA01" may be generated. On the other hand, in the case of LIFOs, the first identifier equals the identifier used to store the last item stored/received thus far (as a function of time), and accordingly may equal the value of write key of FIG. 3.

In step 420, controller 210 checks whether the last entry of an storage structure has been reached. Assuming the flowcharts of FIG. 3 and FIG. 4 are operating in parallel and assuming a FIFO retrieve order, the last entry may be deemed to be reached when the read key is one less than the write key while using the modulo arithmetic subtraction operation in the check. If the last entry has been reached, there are no more items to be accessed and control passes to step 499 where the flow chart ends. Alternatively, controller 210 may merely wait for additional items to be received. If the last entry of the storage structure has not been reached, control passes to step 430.

In step 430, controller 210 accesses an entry in the CAM with the entry having stored key content matching the read key. The identifier held by the read key is used as a search key input to carry out a search of all stored keys within the entries in CAM 250. The contents of the entry having a complete match with the stored identifier (in the corresponding field) is retrieved and the corresponding item may be isolated by removing the identifier from the retrieved content of the CAM entry. The item is then provided to the receiver via output interface 220.

In step 440, controller 210 sets the read key to a next identifier in the set of unique identifiers having a sequential order: The next key may be generated as described above or retrieved from a memory (240) storing the set of identifiers. Control is then passed to step 420.

While controller 210 is described as performing both the storing and retrieval operations in the description above, it should be appreciated that controller 210 can be implemented as multiple units/circuits, with one unit implementing the description of FIG. 3 above and another unit implementing the description of FIG. 4 above.

Further, merely for illustration, it is assumed that the stored items need to be retrieved according to LIFO or FIFO techniques. However, the features can be used to control the sequence in which CAM entries are marked empty again or items are overwritten (for example, in case of limited buffering capacity and some of the items need to be overwritten to accommodate newly arriving items).

The storing of the items in one of ordered storage structures 120A-120Z implemented in a CAM and retrieval of the item in the desired access order is facilitated by the use of unique identifiers, as described above. The description is continued with respect to the manner in which data may be stored in CAM 250 and the related information maintained by controller 210 in example embodiments.

6. Examples

Figure 5A:
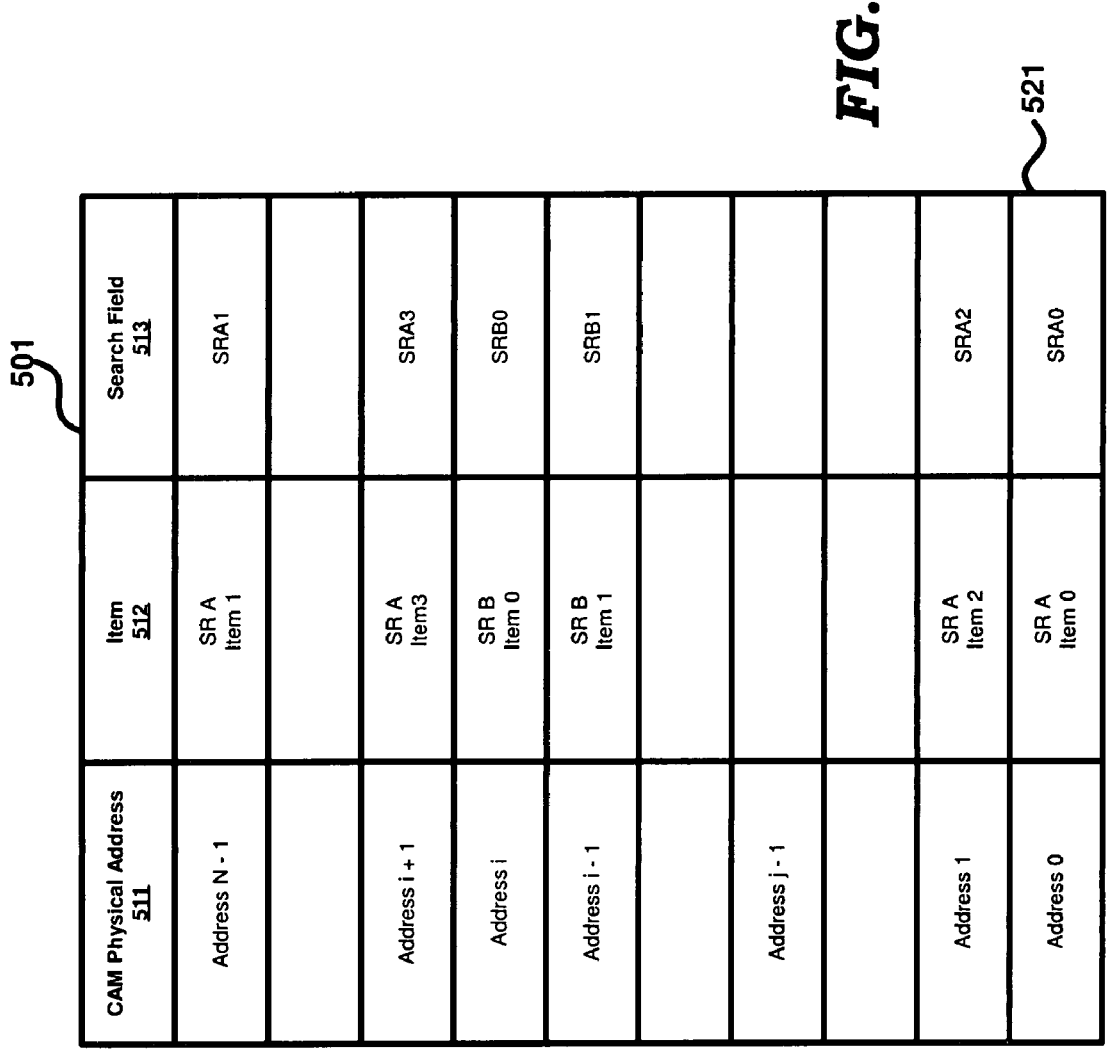

FIG. 5A depicts logically the items and corresponding identifiers stored in CAM 250 in one embodiment. Table 501 contains three columns—CAM physical address 511, item 512 and identifier (search field) 513. CAM physical address 511 shows the address of each entry (shown as a row) of CAM 250. Each entry may correspond to either a part of a CAM word (a basic unit of writing and/or reading) or a complete CAM word itself, such that position of any part of the contents of an item in one CAM entry does de not get aligned with the position of an identifier in the same or another CAM entry (otherwise there will be aliasing between identifier and item during search the operation). Additionally, the relative position of the stored identifier in each CAM entry should be the same.

Each CAM entry is shown storing an item and the corresponding identifier. For example, row 521 shows a CAM entry at physical address 0 contains an item named "item 0", and an identifier named "SRA0", both belonging to buffer "SRA". Identifier 513 is deemed to be stored in the searchable portion (field) of the CAM entries.

By examining the search field (identifiers), it may be appreciated that CAM 250 is storing data related to two queues SR A and SR B. Successive items 0, 1, 2, and 3 of SRA are respectively shown stored in CAM address entries 0, (N−1), 1, and (i+1). Successive (representing the order of storing or desired retrieval order) items 0 and 1 for SR B (another queue) are shown stored in CAM entries with addresses i and (i−1) respectively. The order of items/storage is based on the values in search field 513 (increasing order of the identifiers in search field 513).

FIG. 5B depicts logically the manner in which identifiers for writing (write identifier 524) and identifiers for reading (read identifier 525) may be maintained for each of the queues SRA, SRB and SRZ (only queues SR A and SR B shown in FIG. 5A) according to one embodiment of the present invention. Table 502 contains five columns-Queue identifier 521, write counter 522, read counter 523, write identifier 524 and read identifier 525.

Column 521 shows the identification given (by controller 210) to each of three queues SRA, SRB and SRZ. Each row shows the write counter and the read counter for the corresponding queue and the corresponding identifiers generated for writing (stored in write key of FIG. 3) into and reading (stored in read key of FIG. 4) from the respective queues.

The write counter 522 corresponds to the identifier, which is stored in the variable write key of FIG. 3. To generate the write identifier 524, controller 210 may concatenate the respective queue identifier 521 and write counter 522. For example, in row 530, concatenating queue identifier 521 "SRA" with write counter 522 "4" generates "SRA4" for write identifier 524. When controller 210 receives the next item for queue SRA, the item may be stored in the item 512 portion and identifier SRA4 in the search field 513 of an unused CAM entry with physical address (−1), as shown in FIG. 5D. The write counter 522 is incremented by 1 to "5" and a respective next identifier SRA5 is generated for the next item, as shown in updated row 533 of FIG. 5C.

The read identifier 525 for the items to be read is generated in a similar manner, by concatenating queue identifier 521 and the read counter 523 (corresponding to item count of section 5). For example, concatenating queue identifier 521 "SRA" with read counter "1" generates read identifier 525 as SRA1. When the next item in queue SRA is to be accessed, controller 210 searches search field 513 of CAM 250 for a match for "SRA1". A match may be found in CAM physical address (N−1), whereupon the contents of Item 512 in CAM physical address (N−1) (which contains "SRA Item 1") is retrieved and provided to the respective receiver. The read counter may be incremented by 1 (assuming a FIFO) to "2" and the respective read identifier may be generated as SRA2 (for the next retrieval), as shown in row 533, FIG. 5C.

FIG. 5D depicts logically the items and corresponding identifiers stored in CAM 250 after the write and retrieve operations described above. It may be noted that CAM physical address (j−1) is now shown storing SRA4 in search field 513 and the corresponding item 4 in item field 512, as a result of the write operation described above.

It should be appreciated that (at least a portion of) column 512 can also be implemented as a searchable field, in which case the corresponding (portion of the) item can also be searched. Such search of the item can be the basis for operations such as sorting. For example, assuming a portion of an item stores the destination of a packet in a network device (e.g., a router), the packets may be sorted by the destination for sending multiple packets for the same destination together in one connection setup, while maintaining the access order information in the CAM.

Also, when supporting the FIFO model, the stored information (in column/field 513) represents both the retrieval order as well as stored information. However, when the arrival order is different from the desired retrieval order (e.g., in case of LIFO), the identifiers may have the order of either the arrival order or the access order. In case the arrival order is used in generating the identifiers, the corresponding data is deemed to contain the reorder since the access order would (need to) be computed later when the controller retrieves the items.

In general, ordered storage structures operating as described above, can be implemented in various devices. The description is continued with respect to an example device implementing several aspects of the present invention.

7. Example Device

Figure 6:
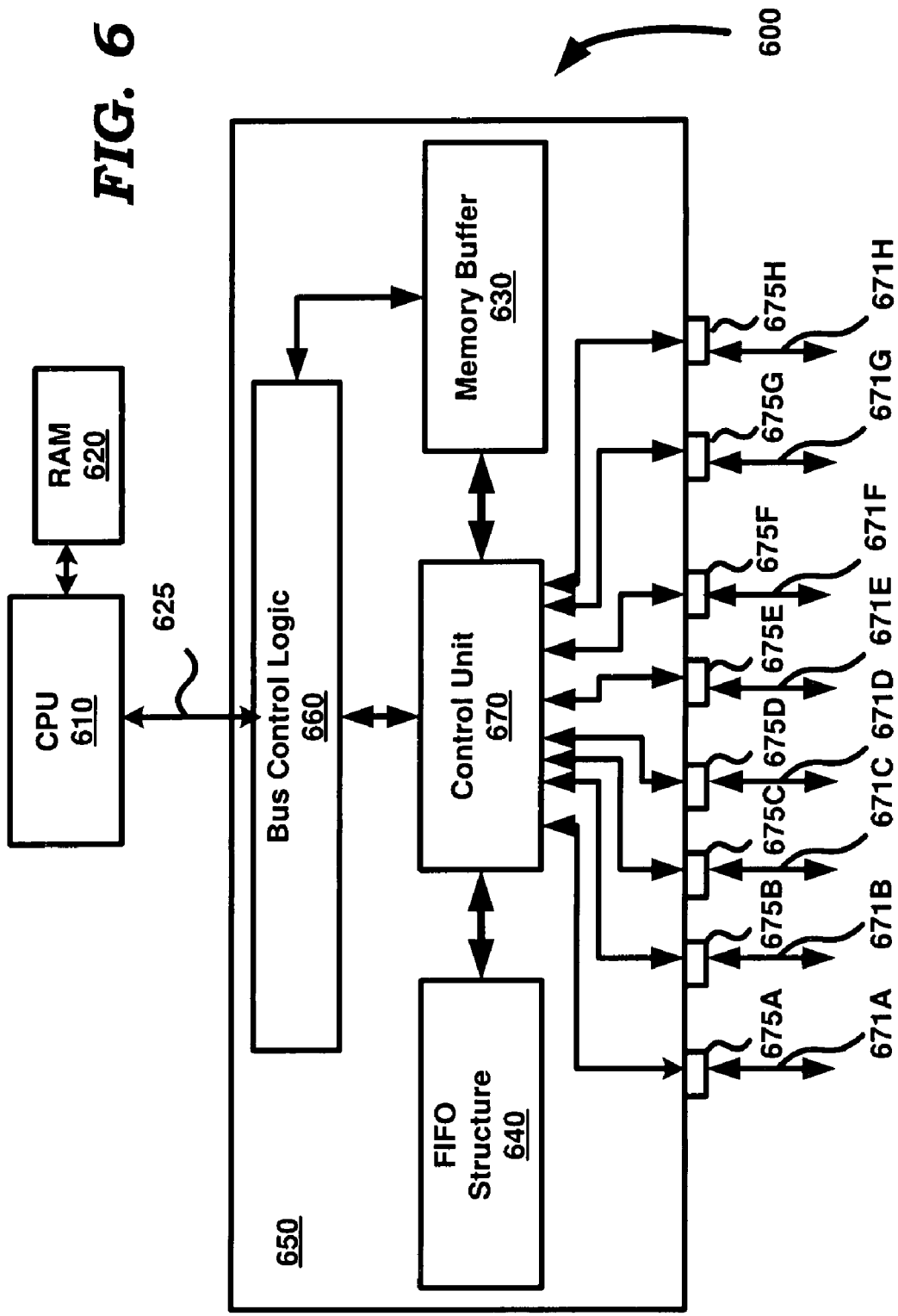
FIG. 6 is a block diagram illustrating an example device in which several aspects of the present invention may be implemented.

FIG. 6 is a block diagram of an example device in which several aspects of the present invention may be implemented. Device 600 is shown containing CPU 610, RAM 620, and storage controller 650. The storage controller in turn is shown containing memory buffer 630, FIFO structure 640, bus control logic 660, control unit 670, and physical ports 675A-675H. Each block of FIG. 6 is described below in further detail.

The block diagram is shown containing only representative systems as generally needed to understand the use of an ordered storage structure. However, real-world environments may contain more/fewer/different systems/components as will be apparent to one skilled in the relevant arts. For example, though eight ports 675A-675H are shown, there may be more or less number of ports. Implementations in such environments are also contemplated to be within the scope and spirit of various aspects of the present invention.

RAM 620 contains locations to store program (instructions) and/or data, which are used by CPU 610. Bus 625 provides the paths necessary for conveying control signals and data (including instructions) between CPU 610 and other blocks, i.e., RAM 620 and storage controller 650.

CPU 610 at least in substantial respects controls the operation (or non-operation) of the various blocks in example device 600 by executing instructions stored in RAM 620. In general, CPU 610 reads instructions and data from various types of memory medium such as RAM 620 and secondary storage such as disk drives (not shown).

CPU 610 may use storage controller 650 to write data into secondary storage and also to retrieve the stored data by sending the appropriate read/write commands. Techniques such as direct memory access (DMA) may be used in the read/write operations. In general, CPU 610 issues various read/write requests to storage devices connected via storage controller 650.

Bus control logic 660 provides the physical, electrical and protocol interfaces necessary for storage controller 650 to interface with bus 625 and the necessary control for receiving read commands from CPU 610. The read commands may be passed to control unit 670 or stored in FIFO structure 640. The data retrieved (via ports 675A-675H) may be read from memory buffer 630 and stored in RAM 620 using techniques such as DMA.

Similarly, bus control logic 660 receives write commands (specifying the target port/disk) and data to be written. Bus control logic 660 may pass the data and commands to control unit 670, or write the data and commands respectively into memory buffer 630 and FIFO structure 640 (example of an ordered storage structure).

Each physical port 675A-675H is connected to a corresponding secondary storage (not shown) or multiple secondary storage devices using topology expander devices (not shown) through paths 671A-671H. The data to be written into a secondary storage or read from a secondary storage passes through the corresponding physical port and path. A number of physical ports may be combined to form a logical port (for example, two physical ports 675A and 675B together may form a logical port or four physical ports 675E-675H together may form a logical port) for providing for example higher data transfer bandwidths.

Memory buffer 630 contains locations to buffer the data, which is being transferred from/to the secondary storage connected to storage controller 650. Buffering may be required, for example, due to speed mismatch in data transfers (or other bottlenecks) between RAM 620 and secondary storage connected to storage controller 650.

FIFO structure 640 represents an example ordered storage structure implemented, for example, as described in sections above. The FIFO structure is designed to buffer commands (such as read/write) received from CPU 610 for the secondary storage structure(s) connected to storage controller 650 on ports 675A-675H. There may be as many queues in FIFO structure 640 as the number of secondary storage units are connected. However, alternative embodiments can have more or fewer queues.

Control unit 670 processes the various read and write requests received from bus control logic 660. Control unit 670 buffers the commands in queues for each of the corresponding ports (logical or physical) or destination storage devices in FIFO structure 640. Control unit 670 may examine each request to determine the specific queue in which the request is to be placed. A single queue may be maintained for each logical port and further for each destination storage device. In case grouping of ports as logical ports is not supported, each physical port is viewed as a logical port.

Control unit 670 may indicate to controller 210 in the specific FIFO queue in which each request (example of an item) is to be queued. The queue identifiers 521 of column 521 may accordingly be provided by control unit 670. Control unit 670 may receive the buffered requests according to the desired access order (FIFO in this case).

Control unit 670 thus receives the requests and issues the corresponding commands on the respective ports. In case of read requests, the data may be received on the corresponding port. Control unit 670 may store the received data in memory buffer 630, which is then transferred by bus control logic 660 to RAM 620. On the other hand, in case of write requests, control unit 670 may first store the data received from bus control logic 660 in memory buffer 630, and when the write command is processed in the sequence (buffered in the queues of FIFO structure 640), the data may be retrieved and sent along with appropriate commands on the respective ports to write the data into the secondary storage units.

It may be appreciated that the ordered storage structures, described above, may be modified in various ways, without departing from the scope and spirit of various aspects of the present invention, as will be apparent to one skilled in the relevant arts.

8. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A storage structure comprising:
  a Content Addressable Memory (CAM) containing a plurality of entries; and
  a controller operable for receiving a plurality of items from a sender and which are to be accessed by a receiver according to an access order, said sender and said receiver comprising a sender-receiver pair,
  said controller also operable for storing each of said plurality of items associated with a corresponding one of a set of identifiers in one or more of said plurality of entries,
  wherein said identifiers each comprise a first portion comprising a unique identifier for said sender-receiver pair and a second portion that reflects said access order, wherein each of said identifiers is generated by concatenating said first portion and said second portion,
  said controller further operable for setting a write key that is set to each of said set of identifiers before the identifier is stored in said CAM, wherein said storing stores said write key that is set to a first identifier when storing a first item and stores said write key that is set to a next identifier following said first identifier when storing the next item following said first item.

2. The storage structure of claim 1, wherein each of said plurality of entries contains a searchable field in a column, wherein said controller is operable for storing each of said set of identifiers in said searchable field,
  said controller also operable for providing each of said set of identifiers in said order as a search key input to said CAM to retrieve a respective one of said plurality of items in said access order.

3. The storage structure of claim 2, wherein said access order is selected from the group consisting of: first-in-first-out (FIFO) and last-in-first-out (LIFO).

4. The storage structure of claim 3, wherein if said controller receives another plurality of items which are to be accessed according to another access order, then said controller stores each of said another plurality of items associated with a corresponding one of another set of item identifiers in a corresponding one or more of said plurality of entries, wherein said another set of item identifiers are in an order matching said another access order.

5. The storage structure of claim 2, wherein said plurality of items are processed as a single queue with said access order, wherein said controller is operable for storing items related to a plurality of queues with corresponding access orders in said CAM.

6. The storage structure of claim 1, wherein said controller is operable for setting a read key to each of said identifiers in said access order, and then using said read key as a search key to retrieve the corresponding one of said plurality of items from said CAM.

7. A device comprising:
  a content addressable memory (CAM) containing a plurality of entries; and
  a controller operable for receiving a plurality of items, wherein said plurality of items are to be accessed according to an access order, said controller also operable for storing each of said plurality of items associated with a corresponding one of a set of identifiers in a queue comprising one or more of said plurality of entries, wherein said identifiers each comprise first information identifying said queue and second information that reflects said access order, wherein each of said identifiers is generated by concatenating said first information and said second information, said controller further operable for setting a write key that is set to each of said set of identifiers before the identifier is stored in said CAM, wherein said storing stores said write key that is set to a first identifier when storing a first item and stores said write key that is set to a next identifier following said first identifier when storing the next item following said first item.

8. The device of claim 7, wherein each of said plurality of entries contains a searchable field in a column, wherein said controller is operable for storing each of said set of identifiers in said searchable field, said controller also operable for providing each of said set of identifiers in said order as a search key input to said CAM to retrieve said plurality of items.

9. The device of claim 7, further comprising a processor operable for sending said plurality of items to said controller.

10. The device of claim 8, further comprising a storage controller coupled to a plurality of secondary storages, wherein each of said plurality of items comprises an access request to one of said plurality of secondary storages, said storage controller containing said CAM and said controller.

11. The device of claim 10, wherein said storage controller further comprises a memory buffer to store data selected from the group consisting of: data retrieved from said plurality of secondary storages in response to read requests, and data to be written into said plurality of secondary storages in response to associated write requests.

12. The device of claim 11, wherein said access order is selected from the group consisting of: first-in-first-out (FIFO) and last-in-first-out (LIFO).

13. The device of claim 7, wherein said controller is operable for setting a read key to each of said identifiers in said access order, and then using said read key as a search key to retrieve the corresponding one of said plurality of items from said CAM.

14. A method of queuing items, said method comprising:
receiving an item from a sender, wherein said item is one of a plurality of items which are to be queued according to a desired access order and accessed by a receiver, said sender and said receiver identified as a sender-receiver pair;

storing said item and a first identifier in an entry of a content addressable memory (CAM), wherein said first identifier is stored in a search field of said CAM, wherein said first identifier is in a set of identifiers with an order matching said desired access order and wherein said first identifier comprises said sender-receiver pair;

receiving a next item contained in said plurality of items;

storing said next item and a next identifier in another entry of said CAM, wherein said next identifier follows said first identifier in said set of identifiers; setting a write key that is set to each of said set of identifiers before the identifier is stored in said CAM, wherein said storing stores said write key that is set to said first identifier when storing said item and stores said write key that is set to said next identifier when storing said next item;

setting a read key to each of said identifiers in said order; then using said read key as a search key to retrieve the corresponding one of said plurality of items from said CAM.

15. The method of claim 14, wherein said desired access order comprises first-in-first-out (FIFO), said method further comprising:

providing said first identifier and then said next identifier as a respective search key to said CAM to retrieve said item and then said next item according to said desired access order.

16. The method of claim 14, wherein each of said items comprises an access request directed to a corresponding storage.

17. The method of claim 14, further comprising:
receiving another plurality of items to be queued according to another desired access order; and storing each of said another plurality of items associated with a corresponding one of another set of identifiers matching said another desired access order, wherein said another set of identifiers are according to an order matching said another desired access order.

18. The method of claim 17, wherein said desired access order comprises First-in-first out (FIFO) and said another desired access order comprises Last-in-first-out (LIFO).

19. The method of claim 14, wherein each of said identifiers is unique.

* * * * *